United States Patent
Miess

(10) Patent No.: US 9,822,523 B1
(45) Date of Patent: Nov. 21, 2017

(54) HEAVY LOAD BEARINGS AND RELATED METHODS

(71) Applicant: US Synthetic Corporation, Orem, UT (US)

(72) Inventor: David Miess, Highland, UT (US)

(73) Assignee: U.S. Synthetic Corporation, Orem, UT (US)

( * ) Notice: Subject to any disclaimer, the term of this patent is extended or adjusted under 35 U.S.C. 154(b) by 0 days.

(21) Appl. No.: 15/053,936

(22) Filed: Feb. 25, 2016

Related U.S. Application Data

(63) Continuation of application No. 14/073,520, filed on Nov. 6, 2013, now Pat. No. 9,284,980.

(60) Provisional application No. 61/723,138, filed on Nov. 6, 2012.

(51) Int. Cl.
| | |
|---|---|
| *E04B 1/36* | (2006.01) |
| *F16C 33/16* | (2006.01) |
| *E01D 19/04* | (2006.01) |
| *F16C 43/02* | (2006.01) |
| *F16C 33/04* | (2006.01) |

(52) U.S. Cl.
CPC .............. *E04B 1/36* (2013.01); *E01D 19/042* (2013.01); *F16C 33/043* (2013.01); *F16C 33/16* (2013.01); *F16C 43/02* (2013.01); *F16C 2206/00* (2013.01); *F16C 2240/40* (2013.01)

(58) Field of Classification Search
CPC ...... F16C 17/04; F16C 17/065; F16C 33/043; F16C 33/108; F16C 43/02; F16C 2224/40; F16C 2240/70; F16C 2352/00; F16C 2206/00; E04B 1/36; E04D 19/04; E04D 19/042

USPC ......... 384/36–37, 39, 42, 92, 105, 282, 293, 384/308; 52/167.5, 167.9; 175/420.2
See application file for complete search history.

(56) References Cited

U.S. PATENT DOCUMENTS

| | | |
|---|---|---|
| 2,680,259 A | 6/1954 | Milk |
| 3,105,252 A | 10/1963 | Milk |
| 3,745,623 A | 7/1973 | Wentorf |
| 4,238,137 A | 12/1980 | Furchak et al. |
| 4,320,549 A | 3/1982 | Greb |
| 4,468,138 A | 8/1984 | Nagel |

(Continued)

FOREIGN PATENT DOCUMENTS

| | | | |
|---|---|---|---|
| DE | 102005014228 A1 * | 10/2006 | ........... E01D 19/048 |
| EP | 0543461 | 5/1993 | |
| JP | 5399202 B2 * | 1/2014 | ............. E01D 21/00 |

*Primary Examiner* — Marcus Charles
(74) *Attorney, Agent, or Firm* — Holland & Hart

(57) ABSTRACT

Bearing assemblies, bearing components and related methods are provided for heavy load applications. In one embodiment, a bearing assembly includes a first bearing apparatus having a base member and a first plurality of polycrystalline diamond compacts (PDCs) on a first surface of the base member, the first plurality of PDCs defining a first collective bearing surface. A second bearing apparatus is configured to engage and slide over the first collective bearing surface. the second bearing apparatus may include a second plurality of PDCs defining a second collective bearing surface. The collective bearing surfaces may be configured to be substantially planar or substantially arcuate. Such bearing assemblies may be implemented in, for example, bridges, roadways, buildings, railways and other structures and machines that may require heavy load bearing support.

21 Claims, 12 Drawing Sheets

(56) References Cited

U.S. PATENT DOCUMENTS

| | | | |
|---|---|---|---|
| 4,620,601 A | 11/1986 | Nagel | |
| 4,910,930 A | 3/1990 | Way | |
| 5,253,939 A | 10/1993 | Hall | |
| 6,160,864 A | 12/2000 | Gou et al. | |
| 6,289,640 B1 * | 9/2001 | Ueda | E04H 9/022 52/167.4 |
| 7,060,641 B2 | 6/2006 | Qian et al. | |
| 7,458,158 B2 | 12/2008 | Luo et al. | |
| 7,552,782 B1 | 6/2009 | Sexton et al. | |
| 7,845,438 B1 * | 12/2010 | Vail | C22C 26/00 175/426 |
| 7,866,418 B2 | 1/2011 | Bertagnolli et al. | |
| 7,901,137 B1 | 3/2011 | Peterson | |
| 7,971,663 B1 * | 7/2011 | Vail | B01J 3/062 175/428 |
| 7,998,573 B2 | 8/2011 | Qian et al. | |
| 8,326,074 B2 | 12/2012 | Feng et al. | |
| 8,402,702 B1 * | 3/2013 | Villaverde | E04H 9/022 14/73.5 |
| 8,672,550 B1 | 3/2014 | Peterson | |
| 2004/0190804 A1 | 9/2004 | John et al. | |
| 2007/0081749 A1 | 4/2007 | Sexton et al. | |
| 2009/0152015 A1 * | 6/2009 | Sani | E21B 10/567 175/420.2 |
| 2010/0218995 A1 | 9/2010 | Sexton et al. | |
| 2010/0243336 A1 | 9/2010 | Dourfaye et al. | |
| 2010/0294571 A1 | 11/2010 | Belnap et al. | |
| 2011/0023375 A1 * | 2/2011 | Sani | B22F 3/24 51/297 |
| 2011/0174544 A1 | 7/2011 | Scott et al. | |
| 2012/0060306 A1 | 3/2012 | Wallerstrom | |
| 2013/0182980 A1 | 7/2013 | Peterson et al. | |

\* cited by examiner

HEAVY LOAD BEARINGS AND RELATED METHODS

CROSS-REFERENCE TO RELATED APPLICATIONS

This application claims the benefit of U.S. patent application Ser. No. 14/073,520 filed on Nov. 6, 2013, which claims the benefit of U.S. Provisional Application No. 61/723,138, filed on Nov. 6, 2012, the disclosures of each of which are incorporated by reference herein in their entireties.

TECHNICAL FIELD

The present invention relates generally to bearings and, more specifically, to heavy load bearings and related methods which may be implemented, for example, in association with roads, bridges, buildings and other structural applications.

BACKGROUND

Bearings are used in a variety of machines and structures. A bearing is generally configured to enable relative movement of two different components or structures between which the bearing is positioned. In one example, one or more bearings may be configured to enable substantially continual displacement of such components, such as rotors and stators in a motor or pump design. In another example, bearings are used, as "expansion" or "isolation" type bearings in association with a large structure such as a road, a bridge or a building.

Considering expansion and isolation type bearings, such bearings are used to accommodate the inherent expansion and contractions that occur in structures such as roads and bridges. There are various difficulties in designing such bearings. For example, the expansion and contraction of roads and bridges (and other structures) often occur due to continually changing temperature conditions. Additionally, cycling loads (e.g., from vehicles passing over a bridge) or occasional forces of nature (e.g., earthquakes and winds) cause movements in large, man made structures. Thus, considering bridges as example, engineers must be able to design bridge joints with bearings that can both accommodate extreme loads (e.g., the bridge structure as well as the vehicles that use the bridge) while also enabling relative displacement of mating components without significant forces and stresses being generated within the structure since excessive forces can easily damage the structure requiring significant costs to repair if not catastrophic failure. Another issue associated with heavy load bearings is the ability to provide a bearing that resists corrosion from the elements such as moisture and salt. Additionally, a heavy load bearing desirably exhibits a long service life and requires relatively little maintenance.

Most conventional bridge bearings are currently made of a polymer material such as polytetrafluoroethylene (PTFE) or an elastomer material. Often, such as in the case of an elastomer bearing, the polymer materials are produced in sheets and designed to move in shear. In other words, the sheet of polymer material becomes strained upon relative displacement of associated bridge components such that the upper surface of the sheet of polymer material is displaced some distance relative to the lower surface of the sheet. For example, referring briefly to FIGS. 1A and 1B, a prior art elastomer bearing 20 is shown including a lower plate 22, an upper plate 24 and an elastomer sheet 26 disposed between the two plates 22 and 24. The lower plate 22 is coupled to a foundational structure 28 and the upper plate is coupled to a structural component 30 of, for example, a bridge or a building. FIG. 1A shows the bearing 20 in a stable or "at rest" condition. FIG. 1B shows the bearing after the structural component 30 has been displaced relative to the foundational structure 28 as indicated by directional arrow 32. This displacement causes the elastomer sheet 26 to distort (as indicated by the angled end surfaces of the elastomer sheet 26 shown in FIG. 1B).

In some bearings, the polymer material may be laminated such that multiple sheets of polymer material are used, sometimes with a structural reinforcing member (e.g., a metal sheet) disposed between each adjacent pair of polymer sheets. However, there are various limitations associated with such bearings that employ polymer sheets.

For example, when used in heavy load applications, elastomers can be limited in the lateral movement that they can accommodate for the loads they must bear. In many applications, horizontal movement can easily be many inches in multiple directions which is not easily tolerated by a thicker elastomer bearing (as may be required due to expected loadings), even when laminated in construction. Additionally, elastomers are conventionally susceptible to material property changes over time. Elastomer bearings may also be prone to "walk" out of their position between adjacent bearing plates over time. Environmental conditions are also a concern for elastomer bearings. For example, elastomer materials often experience deterioration due to exposure to ozone. Material creep can also be an issue when using elastomer bearings.

Referring briefly to FIGS. 2A and 2B, another prior bearing 40 is shown. The bearing 40 is configured as a PTFE sliding bearing and includes a lower plate 42, a layer of PTFE 44 bonded to the lower plate, and an upper plate 46 configured to slide across the layer of PTFE 44. The lower plate 42 is coupled to a foundational structure 48 and the upper plate is coupled to a structural component 50 of, for example, a bridge or a building. FIG. 2A shows the bearing 20 in a first position and FIG. 1B shows the bearing after the structural component 50 has been displaced relative to the foundational structure 48 as indicated by directional arrow 52. Ideally, the PTFE layer 44 is not distorted (as with the elastomer bearing), but rather accommodates mutual displacement of the two plates 42 and 46 due to the low coefficient of friction of the PTFE material. As with elastomer type bearings, there are drawbacks in using PTFE sliding bearings.

In bearing applications, PTFE has a limited service life, even under ideal conditions. However, ideal conditions are not the norm with respect to bridges and other heavy load applications. Rather, such applications often provide harsh and dirty environments for the bearing, elevating the risk of failure in PTFE. As such, added care is required in designing and maintaining PTFE bearings in an effort to keep them clean.

Some reports indicate that some PTFE failures are due to uneven or excessive loading in localized areas of the bearing surface. Additionally, PTFE is not a preferred material when the bearing is anticipated to experience relatively fast movements. Further, PTFE is susceptible to creep or cold flow under higher compressive loads and is generally prone to wear as movement occurs and it will require replacement over time. All of these issues make PTFE a material that is susceptible to failure in conditions experienced by slide bearings that may be used, for example, in a bridge or other heavy load application.

Other bearings are used in heavy load applications such as bronze sliding plate bearings, metal plate bearings having a graphite-impregnated asbestos sheet between the metal bearing plates, rocker bearings, roller bearings and pin-and-link bearings. However, all of these bearings exhibit shortcomings and are prone to wear, corrosion and deterioration due to the service demands placed on the bearings in relatively harsh environments. For example, in many of these bearings, including sliding plate bearings where a metal plate is used to provide the bearing surface, such bearings may freeze such that the bearing no longer slides or rotates as originally designed. The freezing of a bearing may occur due to a variety of reasons including corrosion, mechanical binding, dirt buildup or wear of one bearing component by the mating bearing component (e.g., due to localizing application of forces).

It is a continual desire in the industry to develop bearings that provide benefits in one or more categories such as mechanical strength, corrosion resistance, wear resistance, extended service life, and low coefficient of friction.

BRIEF SUMMARY OF THE INVENTION

In accordance with the present invention, various embodiments of bearing assemblies, bearing components and related methods are provided for heavy load applications. In accordance with one embodiment, a heavy load bearing assembly is provided. The bearing assembly comprises a first bearing apparatus having a base member and a first plurality of polycrystalline diamond compacts (PDCs) on a first surface of the base member, the first plurality of PDCs defining a first collective bearing surface. A second bearing apparatus is configured to engage and slide over the first collective bearing surface. In one particular embodiment, the second includes a base member and a second plurality of PDCs on a surface of the base member, wherein the second plurality of PDCs define a second collective bearing surface configured to engage and slide over the first collective bearing surface.

In one embodiment, the collective bearing surfaces may be configured to be substantially planar. In another embodiment, the collective bearing surfaces may be configured to be substantially arcuate. In another embodiment, one of the collective bearing surfaces may be substantially planar and the other collective bearing surface may be substantially arcuate.

In some embodiments, additional components may be provided in association with one or both of the bearing apparatuses. For example, as an elastomer sheet or an oil filled bladder may be associated with wither or with or both of the bearing apparatuses.

In one embodiment, the PDCs may include a diamond table disposed on a substrate. One or more of the PDCs may include a region in the diamond table that is substantially void of catalyst material. In one embodiment, the PDCs may be substantially cylindrical and exhibit a diameter of about 13 millimeters (mm) and about 19 mm. In another embodiment, the PDCs may be substantially cylindrical and exhibit a diameter of about 60 mm.

In accordance with another embodiment of the present invention, a structure is provided. The structure includes a first component and a first bearing apparatus coupled with the first component. The first bearing apparatus includes a base member and a first plurality of polycrystalline diamond compacts (PDCs) on a first surface of the base member, wherein the first plurality of PDCs define a first collective bearing surface. The structure also includes a second component and a second bearing apparatus coupled with the second component, wherein the second bearing apparatus is configured to engage and slide over the first collective bearing surface upon relative displacement of the first component and the second component. In one particular embodiment, the second bearing apparatus includes a base member and a second plurality of PDCs on a surface of the base member, the second plurality of PDCs defining a second collective bearing surface configured to engage and slide over the first bearing surface. The first and second components may include, for example, foundational components or structures, structural components or other members of a given structure. The structure may be configured, for example, as a bridge, a roadway or a building.

In accordance with yet another embodiment of the present invention, a method is provided for enabling displacement of two different components in a structure. The method includes coupling a first component of the structure to a first bearing apparatus comprising a first plurality of polycrystalline diamond compacts (PDCs) on a first surface of the base member, wherein the first plurality of PDCs define a first collective bearing surface. A second component of the structure is coupled to a second bearing apparatus and a surface of the second bearing apparatus engages in sliding contact with the first collective bearing surface.

Various other embodiments, features and advantages of the present invention will be apparent to those of ordinary skill in the art upon reading of the detailed description below. It is understood that various features or components of one described embodiment herein are contemplated as being combined with features or components of other described embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1A:
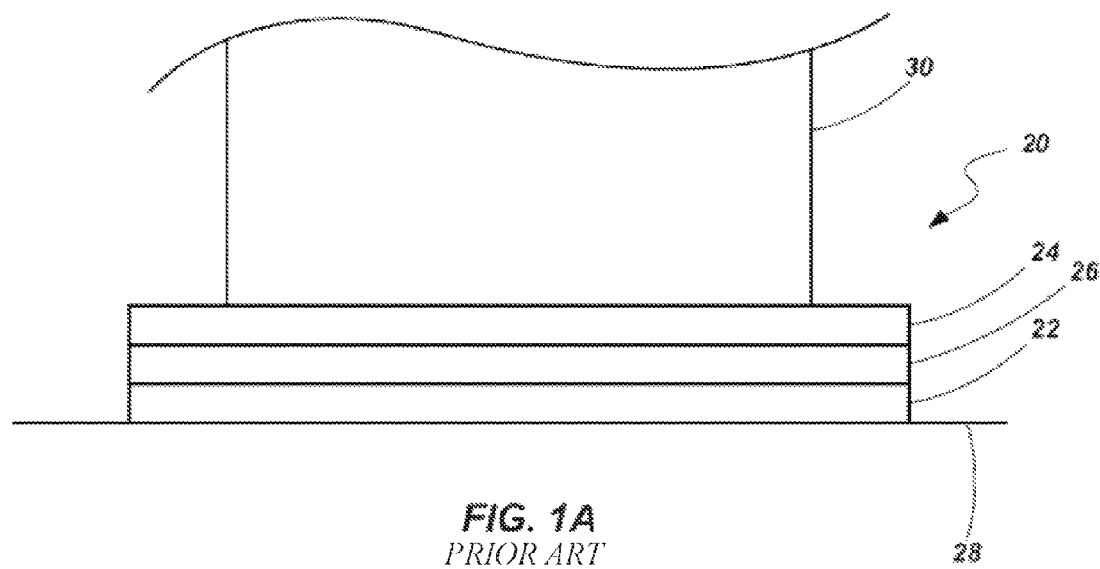
FIGS. 1A and 1B show a prior art bearing in two different states.
Figure 1B:
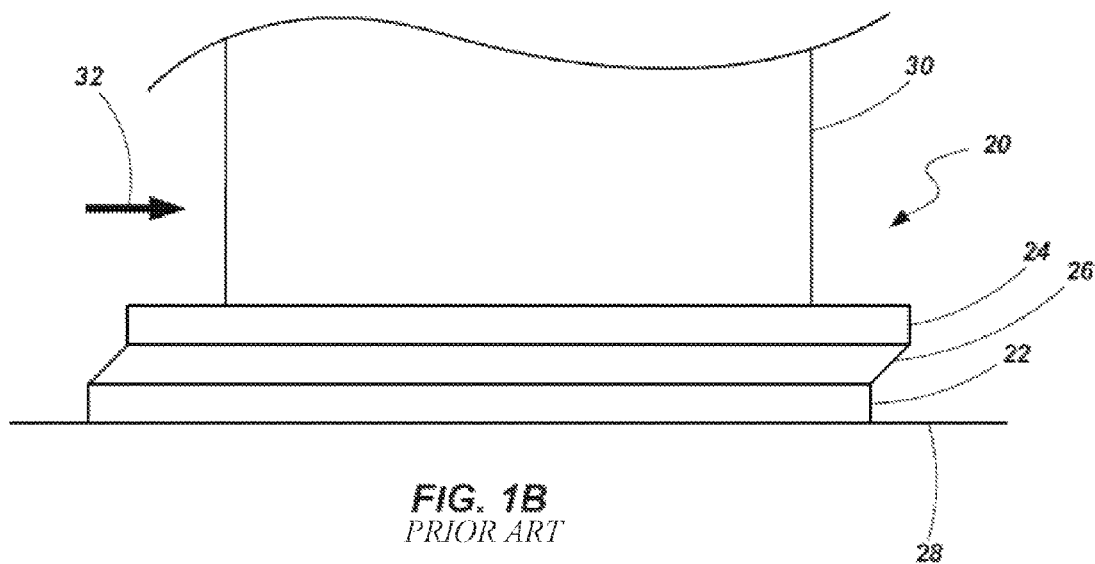
Figure 2A:
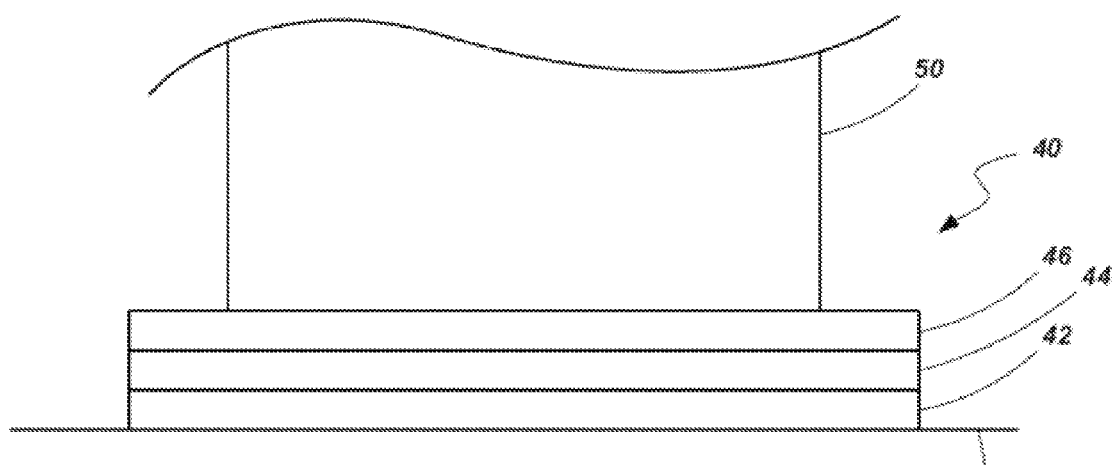
FIGS. 2A and 2B show a prior art bearing in two different states.
Figure 2B:
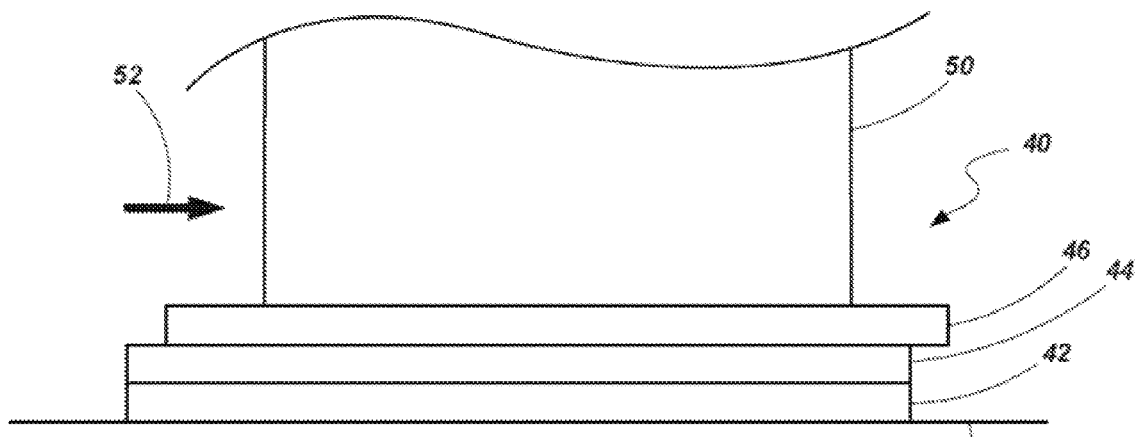

The present invention relates generally to bearing elements and apparatuses that may include bearing surfaces comprising superhard materials. "Superhard," as used herein, refers to any material having a hardness that is at least equal to or exceeds a hardness of tungsten carbide (e.g., without limitation, polycrystalline diamond, boron nitride, silicon carbide, silicon nitride, aluminum nitride, aluminum oxide, titanium diboride, yttrium oxide, boron carbide and mixtures of the foregoing). For example, in various embodiments, one or more polycrystalline diamond compacts (PDCs) may be used to form a bearing surface in the bearing apparatuses and assemblies of the presently disclosed invention. In another embodiment, polycrystalline diamond may include nanodiamond (e.g., ultra-dispersed diamond), if desired. In yet another example, the bearing surface may include a silicon carbide and a diamond composite material such as is disclosed in U.S. Pat. No. 7,060,641, the disclosure of which is incorporated herein, in its entirety, by this reference. A variety of other superhard materials may be utilized in forming a superhard bearing in accordance with the presently disclosed invention as will be appreciated by those of ordinary skill in the art.

A PDC is conventionally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond with diamond-to-diamond bonds. Additionally, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are some non-limiting examples of solvent catalysts that may be used in forming polycrystalline diamond.

In one configuration, during sintering, the solvent catalyst may include the substrate body (e.g., cobalt from a cobalt-cemented tungsten carbide substrate). In such a case, the solvent catalyst from the substrate becomes liquid and sweeps from the region adjacent to the diamond powder and into the diamond grains. In another embodiment, a solvent catalyst may be mixed with the diamond powder prior to sintering, either in lieu of, or in addition to, the existence of a solvent catalyst in a substrate. Thus, diamond grains become mutually bonded to form a polycrystalline diamond table upon the substrate. A conventional process for forming polycrystalline diamond structures is disclosed in U.S. Pat. No. 3,745,623 to Wentorf, Jr. et al., the disclosure of which is incorporated, in its entirety, by this reference. Additional information regarding polycrystalline diamond, sintering processes and related materials and products are described in U.S. Pat. No. 7,866,418 to Bertagnolli et al., U.S. Pat. No. 7,998,573 to Qian et al., and U.S. Pat. No. 8,236,074 to Bertagnolli et al., the disclosures of each of which are incorporated by reference in their entireties.

The catalyst may remain in the polycrystalline diamond layer within the interstitial pores between the diamond grains or may be at least partially removed to a desired depth, such as by leaching (e.g., exposing at least a portion of the diamond table to an acid) or by any other suitable method. Removal of the catalyst may enhance the thermal stability of the PDC material. Optionally, another material may replace the catalyst that has been at least partially removed from the polycrystalline diamond.

Figure 3A:
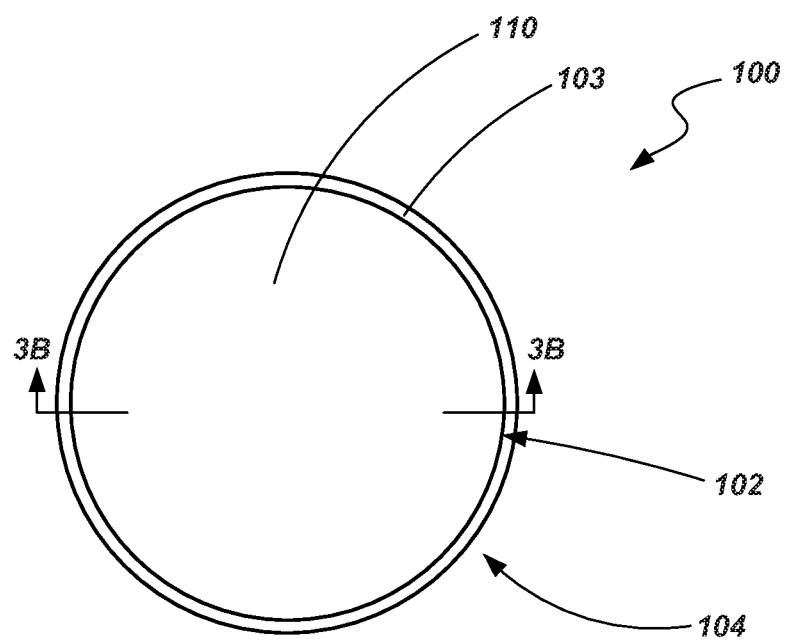
FIG. 3A is top view and FIG. 3B is a cross-sectional view of a bearing element in accordance with an embodiment of the present invention.
Figure 3B:
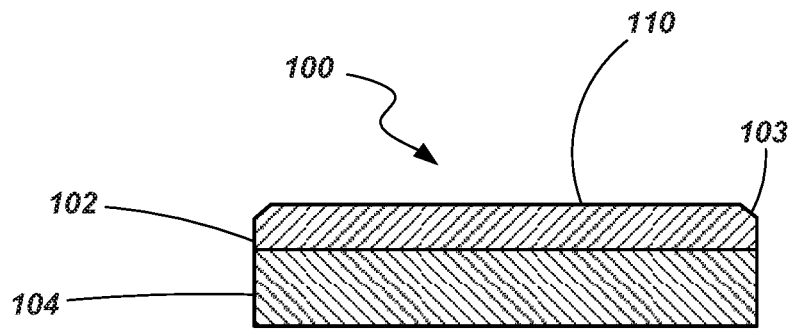

Referring briefly to FIGS. 3A and 3B, a bearing element 100 formed as a PDC element is shown. The bearing element 100 includes a polycrystalline diamond (PCD) layer 102 (sometimes referred to as a table) formed on a substrate 104. The PCD layer 102 may be formed with the substrate 104 using, for example, a high-temperature, high-pressure sintering processes such as set forth above. In some embodiments, though not explicitly shown, the substrate 104 may be optionally attached to a base layer of material.

The upper surface 110 of the diamond table may be configured as a bearing surface for the bearing element 100. In some embodiments, the bearing surface 110 may be finished (e.g., by machine grinding, lapping or other appropriate techniques) to provide a desired surface finish.

In one embodiment, the substrate 104 may comprise tungsten carbide, although other materials may be utilized. In other embodiments, the substrate 104 may be optionally omitted. If employed, a base layer may be formed of a variety of materials including, for example various metals, metal alloys or carbide materials. In one example, an optional base layer may comprise a steel material. In another example, a base layer may comprise a tungsten carbide material (e.g., a cemented tungsten carbide material, such as, for example, cobalt-cemented tungsten carbide).

The bearing element 100 may exhibit a substantially cylindrical geometry as shown, although other geometries are contemplated as well. As shown, the outer peripheral edge of the diamond layer (i.e., between the upper surface 110 and the side wall) may exhibit a chamfer 103 (or a radius) to prevent chipping when the bearing element 100 engages another surface (e.g., a structural component or another bearing element). In one embodiment, the bearing element 100 may be formed as a conventional polycrystalline diamond compact, such as a 13 millimeter (mm) or a 19 mm diameter cylindrical compact. In another embodiment, the bearing element 100 may be formed from a conventional cutting tool blank exhibiting a diameter of, for example, approximately 60 mm. Of course, the bearing element 100 may exhibit other sizes and shapes. In some embodiments, the bearing element may be cut or formed from a conventional PCD compact or tool blank to exhibit a desired shape and size.

Figure 4:
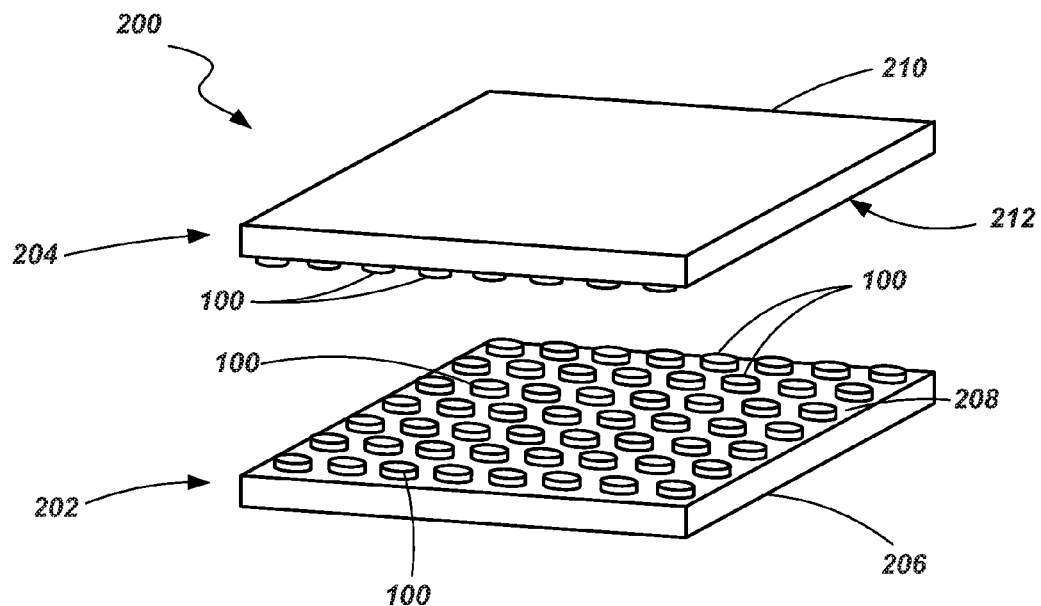
FIG. 4 is an exploded perspective view of bearing assembly according to one embodiment of the present invention.

Referring to FIG. 4, a bearing assembly 200 is shown in accordance with an embodiment of the present invention. The bearing assembly 200 includes a first bearing apparatus 202 and a second bearing apparatus 204. The first bearing apparatus includes a plate or a base member 206 and a plurality of individual bearing elements 100 disposed about a surface 208 of the base member 206. The bearing elements 100 may be spaced in a desired geometric pattern or array about the surface 208 of the base member 206 to define a collective bearing surface. Additionally, the spacing of the bearing elements may be designed to provide a desired density of bearing elements 100. While the plurality of bearing elements 100 are shown to be the same size, different sizes may be used to provide an increased density of bearing elements 100 and, thus, an increased collective bearing surface area.

In one embodiment, the bearing elements 100 may be disposed in pockets formed in the base member 206 and secured by appropriate means (e.g., brazing, adhesive, and/or interference fit). In such an embodiment, the upper surfaces 110 of the bearing elements 100 are at least coplanar with, or extend above the surface 208 of the base member 206. In another embodiment, the bearing elements 100 may be secured directly to the surface 208 of the base member 206 rather than being disposed in pockets. In either case, once the bearing elements 100 are in their desired positions, the upper surfaces 110 of the bearing elements 100 may be ground or otherwise processed to provide a collective bearing surface that exhibits a desired geometry (e.g., a planar geometry or an arcuate geometry).

The second bearing apparatus 204 may be configured substantially similarly to the first bearing component 202 having a plate or base member 210 with a plurality of bearing elements 100 disposed on a surface 212 of the base member 210. The array of bearing elements 100 of the second bearing apparatus 204 may be arranged in a similar manner as those of the first bearing apparatus 202, or they may exhibit a different pattern if desired. Additionally, if desired, the bearing elements 100 disposed on the first bearing apparatus 202 may be substantially identical to those used in the second bearing apparatus 204, or they may exhibit different sizes or shapes.

While the bearing assembly 200 is shown in an exploded view, when in use, the first bearing apparatus 202 and the second bearing apparatus 204 are positioned adjacent one another such that at least some of the bearing elements 100 of the first bearing apparatus 202 contact at least some of the bearing elements 100 of the second bearing apparatus. The diamond tables of the bearing elements 100 of the first bearing apparatus 202 and the diamond tables of the bearing elements 100 of the second bearing apparatus 204 provide a bearing surface such that the first bearing apparatus 202 and the second bearing apparatus 204 may be easily displaced relative to one another when in contact with each other. In one embodiment, the bearing elements 100 of the first bearing apparatus 202 are spaced such that a given bearing element 100 of the second apparatus 204 may contact two adjacent bearing elements 100 of the first bearing apparatus 202 simultaneously. Thus, the bearing elements 100 of one apparatus do not drop or fall into the spaces between the bearing elements 100 of the other apparatus. Stated otherwise, the bearing elements 100 may be arranged on a given bearing apparatus (e.g., the first bearing apparatus 202) such that the spacing between adjacent bearing elements is less than a nominal width or lateral dimension (e.g., the diameter) the of the bearing elements 100 of a corresponding bearing apparatus (e.g., the second bearing apparatus 204). Such a configuration helps to ensure that the bearing surface is maintained during relative lateral displacement of the first bearing apparatus 202 and the second bearing apparatus 204.

Additionally, the array or pattern of bearing elements 100 may be arranged in a variety of ways. For example, the array may include a plurality of rows of bearing elements, where the spacing between rows is substantially equal to the spacing between individual bearing elements in a given row. In another embodiment, the spacing between rows may be greater than the spacing between individual bearing elements 100 of a given row. Thus, for example, where it is anticipated that lateral movement will be limited along a single directional axis, the rows of bearing elements may extend along or parallel to the directional axis (with spacing between individual bearing elements of the rows consistent with the above description), while the rows may be spaced apart from one another a distance that is wider than the width or lateral dimension (e.g., diameter) of the individual bearing elements.

The use of diamond in the bearing elements 100 provides various advantages. For example, diamond will not likely be affected by, or need protection from, water, dirt or particulates during bearing operation as the bearing elements 100 are highly wear resistant and corrosion resistant. Also, the bearing elements 100 are capable of withstanding substantial compressive loads. More specifically, the bearing elements 100 are suited to handle localized loading (e.g., when loads are not evenly distributed across all of the bearing elements 100). In some applications, the distribution of bearing elements may be tailored such that, for example, the density of bearing elements is greater in areas where localized loading is anticipated. Further, while lubricant may be used if desired, it is not required which is in contrast to many prior art bearings. Compared to PTFE, the bearing elements of the present invention can withstand faster rates of relative displacement of the bearing surfaces. As compared to elastomer bearings, extreme lateral movement may be accommodated by the bearings of the present invention. For example, it is conceived that when bearing assemblies of the present invention are used, lateral movement may be achieved in excess of 50 mm (in translation) in one embodiment, in excess of 100 mm (in translation) in another embodiment, in excess of 200 mm (in translation) in another embodiment, and/or in excess of 0.05 radians (in rotation) in other embodiments. Additionally, compared to elastomer bearings, the bearing elements will not deteriorate when subjected to environments having high ozone levels. Nor will there be any substantial deleterious effects on the polycrystalline diamond if a joint next to the bearing elements is welded. Further, the polycrystalline material is not adversely affected by changes in temperature often seen in bearings associated with buildings, roads, bridges or other similar structures.

The bearing apparatuses 202 and 204 may be configured to exhibit a variety of shapes and sizes. For example, they may be configured to exhibit a generally square or rectangular shape, such as shown, or they may be configured to exhibit some other polygonal shape or a circular, oval, or ellipsoid shape. Additionally, while shown to have a substantially planar collective bearing surface, the collective bearing surface may be configured to exhibit some other shape as well, including a substantially cylindrical (or portion of a cylinder), a substantially spherical (or portion of a sphere) or a generally arcuate collective bearing surface.

Considering the example of a substantially square configuration, a bearing apparatus (e.g., 202 or 204) may exhibit a size, for example, it is greater than approximately 4 inches by 4 inches (i.e., greater than approximately 16 square inches). In another example, the bearing apparatus may exhibit a size that is greater than approximately 5 inches by 5 inches (i.e., greater than approximately 25 square inches. In yet another embodiment, the bearing apparatus may exhibit a size from approximately 6 inches by 6 inches (i.e. approximately 36 square inches) to approximately 48 inches by 48 inches (i.e., approximately 2,304 square inches) or larger, depending on the specific application. Of course other dimensions may be used, again depending on application. Additionally, bearing assemblies of the present invention may be configured to bear substantial loads while offering a relatively low coefficient of friction at the bearing surface. For example, polycrystalline diamond has a compressive strength of approximately 6.9 to 7.6 gigapascals (GPa), a Young's Modulus of approximately 700-900 GPa (e.g., approximately 841 GPa) and a coefficient of friction of between 0.05 and 0.08 (in conditions of PCD on PCD in water).

Figure 5:
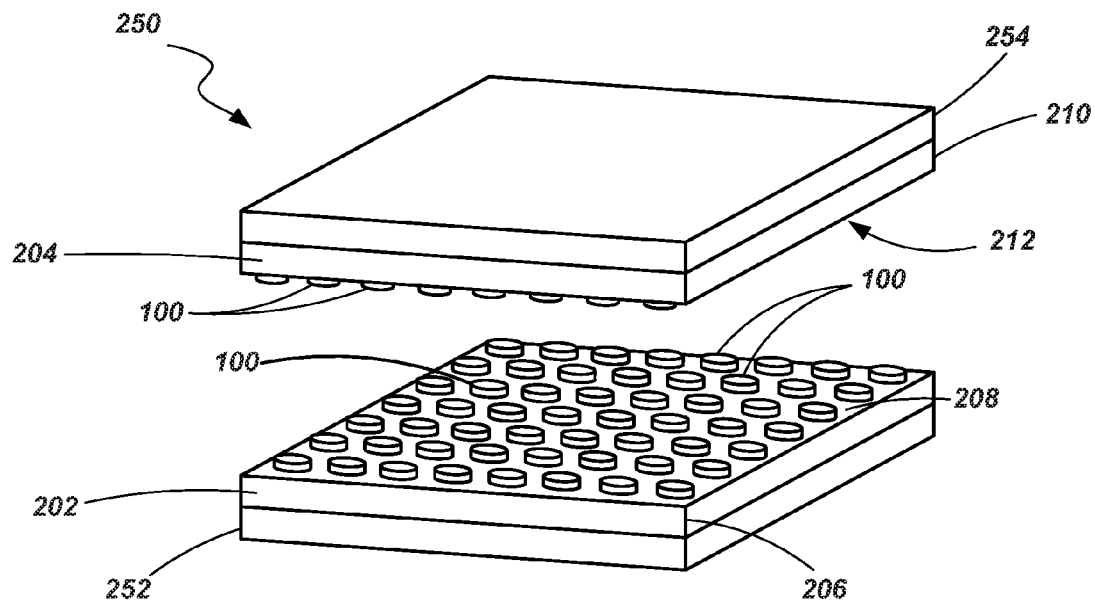
FIG. 5 is an exploded perspective view of bearing assembly according to another embodiment of the present invention.

In some applications, where desired, the bearing elements and bearing assemblies of the present invention may incorporate other materials that provide other additional benefits. For example, referring to FIG. 5, another bearing assembly 250 is shown. The bearing assembly 250 includes the first bearing apparatus 202 and the second bearing apparatus 204 as described above. Additionally, the bearing assembly 250 includes a first polymer member 252 coupled with the base member 206 of the first bearing apparatus 202. In one embodiment, the polymer member 252 may be formed of an elastomer material. The incorporation of the polymer member 252 may provide some dampening in the bearing assembly 250 as may be desired in designing a given structure (e.g., bridge, building, etc.). The second bearing apparatus 204 may also optionally have a polymer member 254 associated with it if desired.

Figure 6:
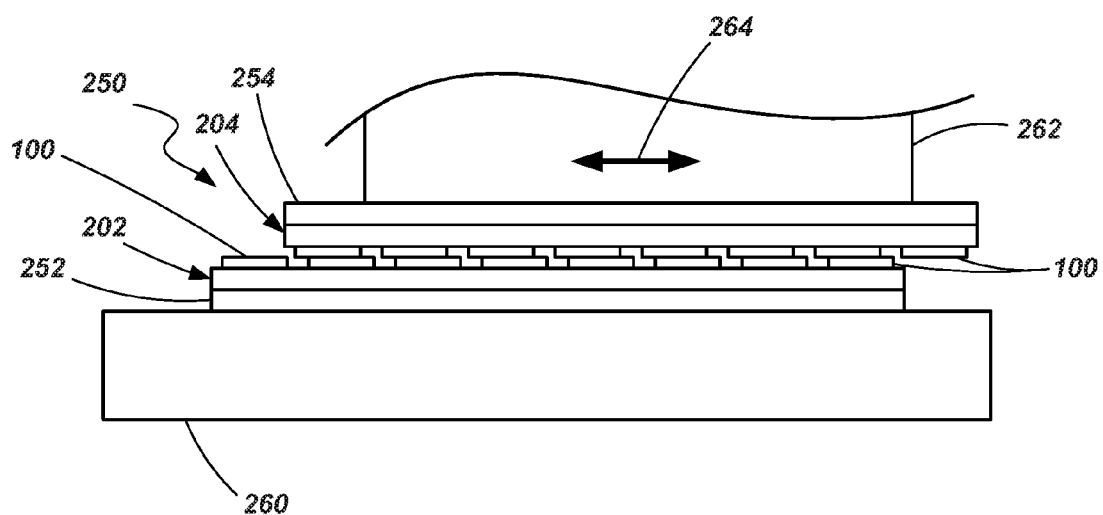
FIG. 6 is a side view of the bearing assembly shown in FIG. 5.

Referring now to FIG. 6, a side view is shown of the bearing assembly 250 incorporated within a structure. The first bearing apparatus 202 and associated elastomer layer 252 is coupled with a foundational member 260 while the second bearing apparatus 204 (shown with the optional elastomer layer 254) is coupled with a structural component 262. When a sufficient force is applied to of the foundational member 260 or the structural component 262, the bearing elements 100 of the second bearing apparatus 204 slide over the bearing elements 100 of the first bearing apparatus 202 to enable displacement of the structural component 262 relative to the foundational member 260 as indicated by directional arrow 264. It is noted that directional arrow 265 is merely an example of the relative lateral movement of the structural component 262 and the foundational member 260. Such lateral movement may also include movement that is substantially perpendicular to the directional arrow 264 (i.e., "into" or "out of" the page) or any lateral direction between that indicated by the directional arrow and its perpendicular.

The force applied to components of the bearing assembly 250 may be generated from a variety of sources including, for example, differences in thermal expansion of the structural component 262 and the foundational member 260, expected loadings of the structure during operation (e.g., vehicles driving over a bridge or roadway), earthquakes and winds. It is also noted that, while the bearing assembly is shown as being installed between a foundational member and a structural component, the bearing assembly may be incorporated used between any combination of components or structures where it is desired to enable relative displacement of such components or structures.

It is noted that the bearing assembly 200 described in reference to FIG. 4 would function substantially similarly to the bearing assembly 250 shown in FIG. 6, although without the dampening provided by an elastomer layers 252 and 254.

Figure 7:
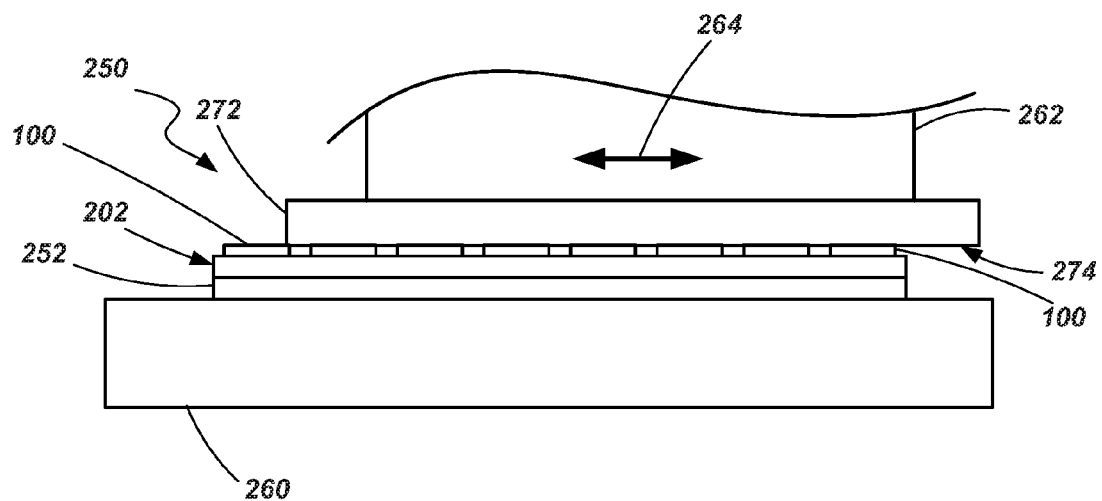
FIG. 7 is a side view of a bearing assembly in accordance with another embodiment of the present invention.

Referring briefly to FIG. 7, another embodiment is shown wherein only one bearing apparatus (e.g., the first bearing apparatus 202) is employed in a bearing assembly 270. In this embodiment, the first bearing apparatus 202 (and optionally an elastomer layer 256) is attached to the foundational member 260 while a bearing plate 272 is coupled to the structural component 262. A bearing surface 274 of the bearing plate 272 engages the bearing elements 100 of the bearing apparatus 202 such that it may slide laterally relative to the bearing apparatus 202 as indicated by directional arrow 264. In another embodiment, the bearing apparatus 202 may be coupled to the structural element 262, while the bearing plate 272 is coupled with the foundational member 260.

Figure 8:
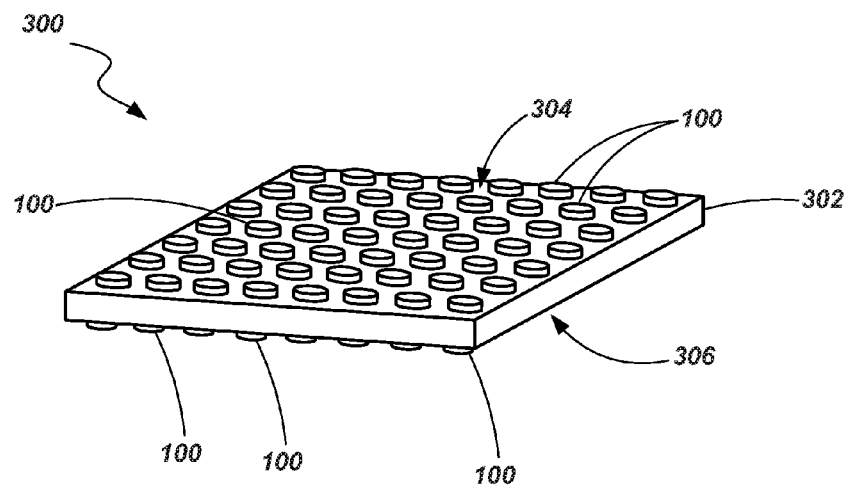
FIG. 8 is a perspective view of a bearing apparatus in accordance with an embodiment of the present invention.

Referring to FIG. 8, another embodiment of a bearing apparatus 300 is shown. The bearing apparatus 300 includes a plate or a base member 302 with a first plurality bearing elements 100 on a first surface 304 and a second plurality of bearing elements 100 disposed on a second surface 306. In the embodiment shown, the first surface 304 and the second surface 306 are opposing faces of the base member 302 and are substantially parallel to one another. However, in other embodiments, the base member 302 may include bearing elements disposed on various surfaces that are not parallel to one another.

Figure 9:
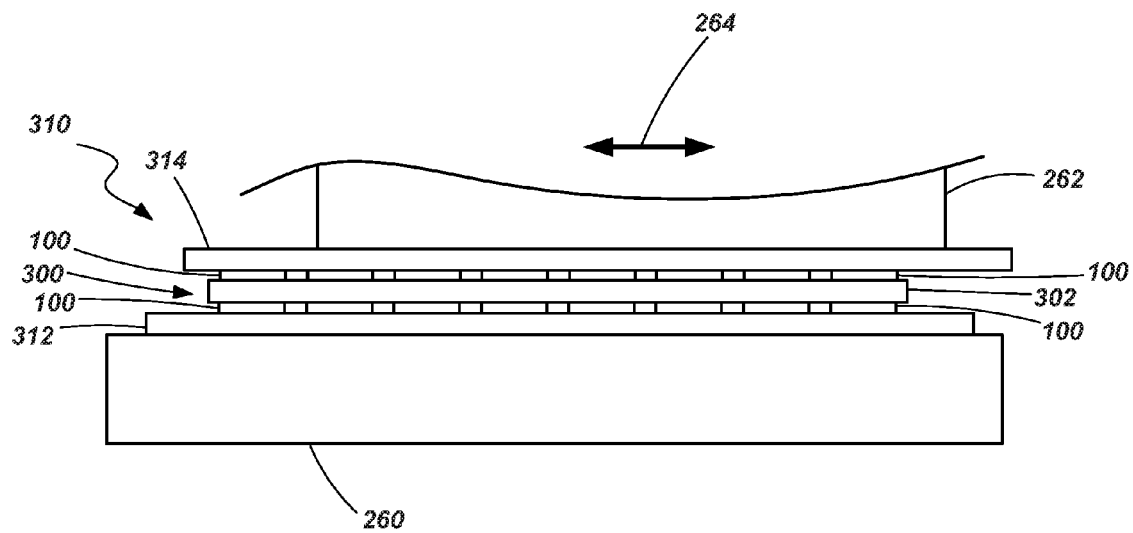
FIG. 9 is a side view of a bearing assembly including the bearing apparatus shown in FIG. 8.

As seen in FIG. 9, the bearing apparatus 300 may be employed in a bearing assembly 310 where the bearing apparatus 300 is disposed between a first bearing plate 312 that is coupled with a foundational member 260 and a second bearing plate 314 that is coupled with structural component 262. The bearing plates 312 and 314 may each independently slide relative to the bearing apparatus 300 to accommodate displacement of the structural component 262 and the foundational member 260.

Figure 10A:
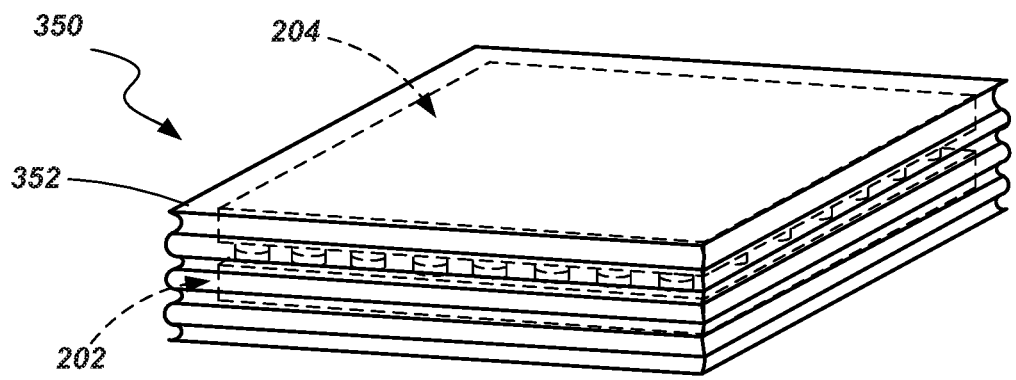
FIGS. 10A and 10B are perspective and partial cross-sectional views, respectively, of a bearing assembly in accordance with another embodiment of the present invention.
Figure 10B:
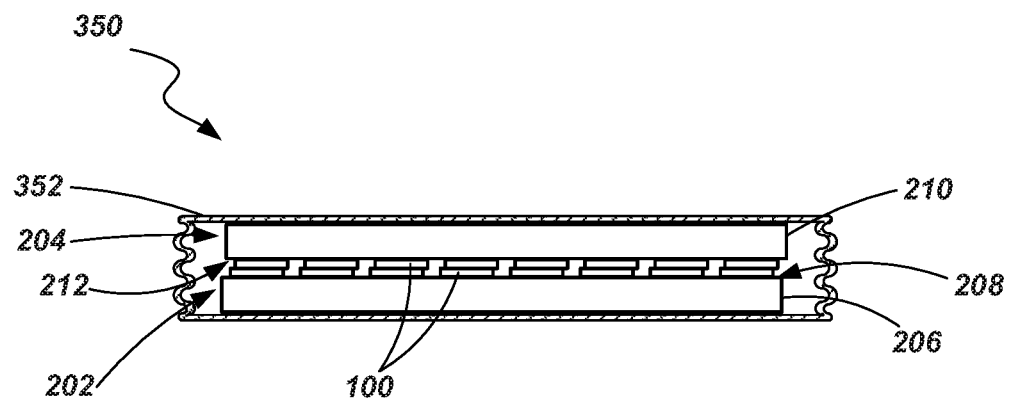

Referring now to FIGS. 10A and 10B, a bearing assembly 350 is shown in accordance with another embodiment. The bearing assembly 350 includes a first bearing apparatus 202 and a second bearing apparatus 204. The first bearing apparatus 202 includes a plate or a base member 206 and a plurality of individual bearing elements 100 disposed about a surface 208 of the base member 206. The second bearing apparatus 204 may be configured substantially similarly to the first bearing apparatus 202 having a plate or base member 210 with a plurality of bearing elements 100 disposed on a surface 212 of the base member 210. In general, the first bearing apparatus 202 and the second bearing apparatus 204 may be configured as described above with respect to FIG. 4. The bearing assembly 350 further includes a flexible bladder 352 positioned about the first bearing apparatus 202 and the second bearing apparatus 204. The flexible bladder 352 may be formed, for example, of corrugated rubber and may be filled with oil such that the bearing apparatuses are in contact with the oil of the bladder 352. The oil filled bladder 352 provides environmental protection for the bearing apparatuses 202 and 204 and may provide reduced friction for the bearing assembly 350. Examples of oil that may be used include silicone grease or molybdenum disulfide, although other types of oils may also be used. In other embodiments, the bearing apparatuses 202 and 204 need not be entirely surrounded by the bladder 352. Instead, a bladder may be configured, for example, as a bellows that extends about, and may be sealed to, the outer peripheries of the bearing apparatuses 202 and 204 such that the area between the two apparatuses, including the collective bearing surfaces, are substantially enclosed by the bellows. Such a bladder configuration may still be filled with oil, grease or some other appropriate material.

In other embodiments, a bladder, a bellows structure or some other covering or shield may be used without the interior being filled with oil, grease or any other material. In such an embodiment, the bladder or other structure may provide protection to the collective bearing surfaces from various environmental elements (e.g., dirt, dust, water, etc.) that would otherwise have an impact on the effective life of the bearing assembly.

Figure 11:
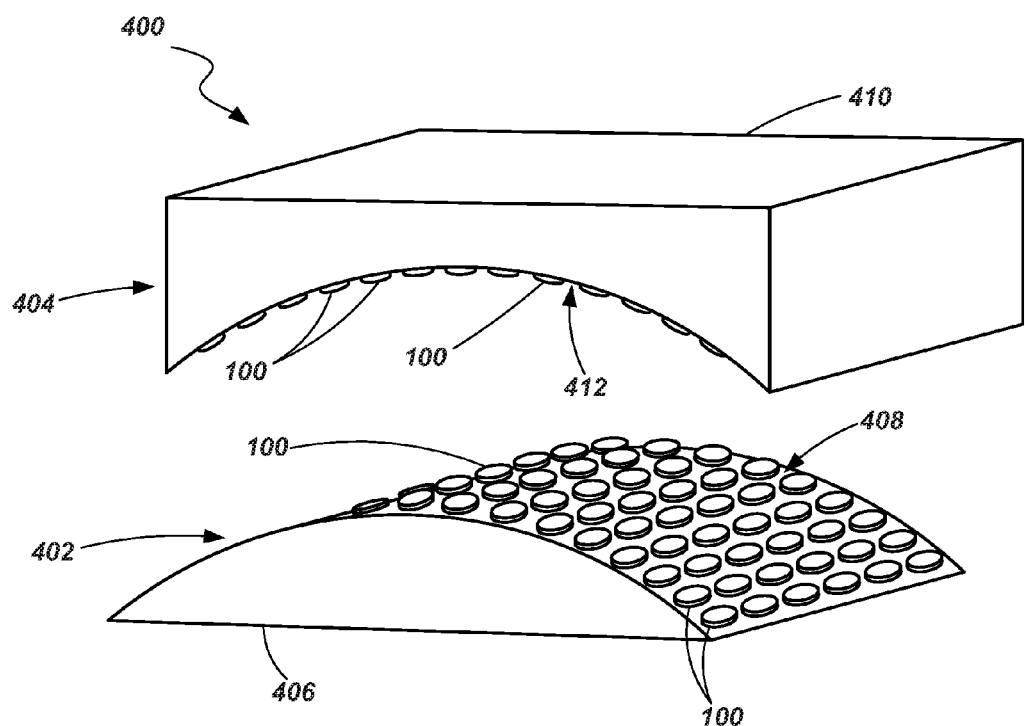
FIG. 11 is an exploded perspective view of bearing assembly according to one embodiment of the present invention.

Referring to FIG. 11, another bearing assembly 400 is shown. The bearing assembly 400 includes a first bearing apparatus 402 and a second bearing apparatus 404. The first bearing apparatus includes a base member 406 and a plurality of individual bearing elements 100 disposed about an arcuate surface 408 of the base member 406. The arcuate surface 408 of the first bearing apparatus is a convex arcuate surface. The bearing elements 100 may be spaced in a desired geometric pattern or array about the surface 408 of the base member 406 to define an arcuate bearing surface generally corresponding to the shape of the arcuate surface 408 of the base member 406. The spacing of the bearing elements may be designed to provide a desired density of bearing elements 100. While the plurality of bearing elements 100 are shown to be the same size, different sizes may be used to provide an increased density of bearing elements 100 and, thus, an increased collective bearing surface area.

The second bearing apparatus 404 also includes base member 410 with a plurality of bearing elements 100 disposed on an arcuate surface 412 of the base member 410. In this case, the arcuate surface 412 is a concave surface. The bearing elements 100 collectively define an arcuate bearing surface that generally corresponds with the arcuate surface 412 of the base member 410. The array of bearing elements 100 of the second bearing apparatus 404 may be arranged in a pattern that generally corresponds to those of the first bearing apparatus 402, or they may exhibit a different pattern if desired. Additionally, if desired, the bearing elements 100 disposed on the first bearing apparatus 402 may be substantially identical to those used in the second bearing apparatus 404, or they may exhibit different sizes or shapes.

It is noted that the arcuate surfaces 408 and 412 of the bearing assembly are shown to be substantially cylindrical, or portions of a cylindrical surface that are substantially the same size. However, the arcuate surfaces may be configured differently if desired. For example, the arcuate surfaces 408 and 412 may be configured to be substantially spherical, different sizes or shapes, or as convex and concave portions of a spherical surface.

Figure 12:
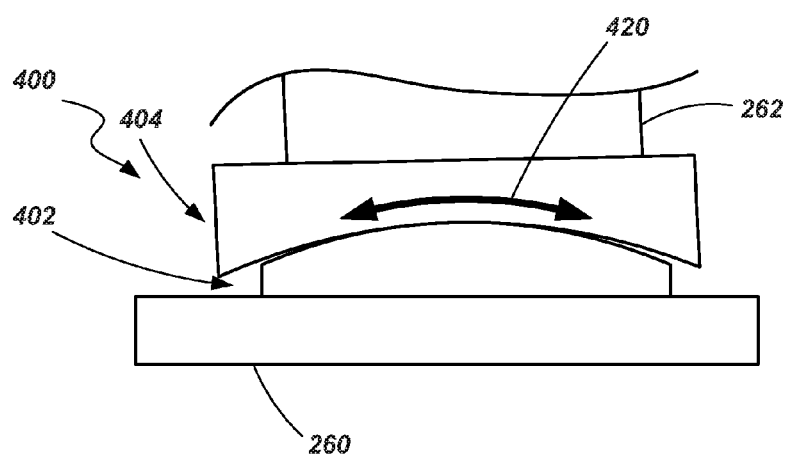
FIG. 12 is a side view of the bearing assembly shown in FIG. 11.

Referring now to FIG. 12, a side view is shown of the bearing assembly 400 incorporated within a structure. The first bearing apparatus 402 is coupled with a foundational member 260 while the second bearing apparatus 404 is coupled with a structural component 262. When a sufficient force is applied to of the foundational member 260 or the structural component 262, the bearing elements 100 of the second bearing apparatus 404 slide over the bearing elements 100 of the first bearing apparatus 402 to enable lateral displacement of the structural component 262 relative to the foundational member 260 as indicated by directional arrow 420. Again, it is noted that directional arrow 420 is only an example of the relative lateral displacement that may take place between the structural component 262 and the foundational member 260. Lateral displacement may also include relative movement that is substantially perpendicular to the directional arrow 420 (i.e., "into" or "out of" the page when viewing FIG. 12) or it may include some combination of these two examples. Generally, lateral displacement is considered to be movement or displacement in (or parallel to) a direction that is along, or tangent to, the collective bearing surface of one or both of the bearing apparatuses of a given bearing assembly. This lateral displacement includes displacement that may be considered "translational," displacement that may be considered "rotational," or some combination of both translational and rotational movement.

Figure 13:
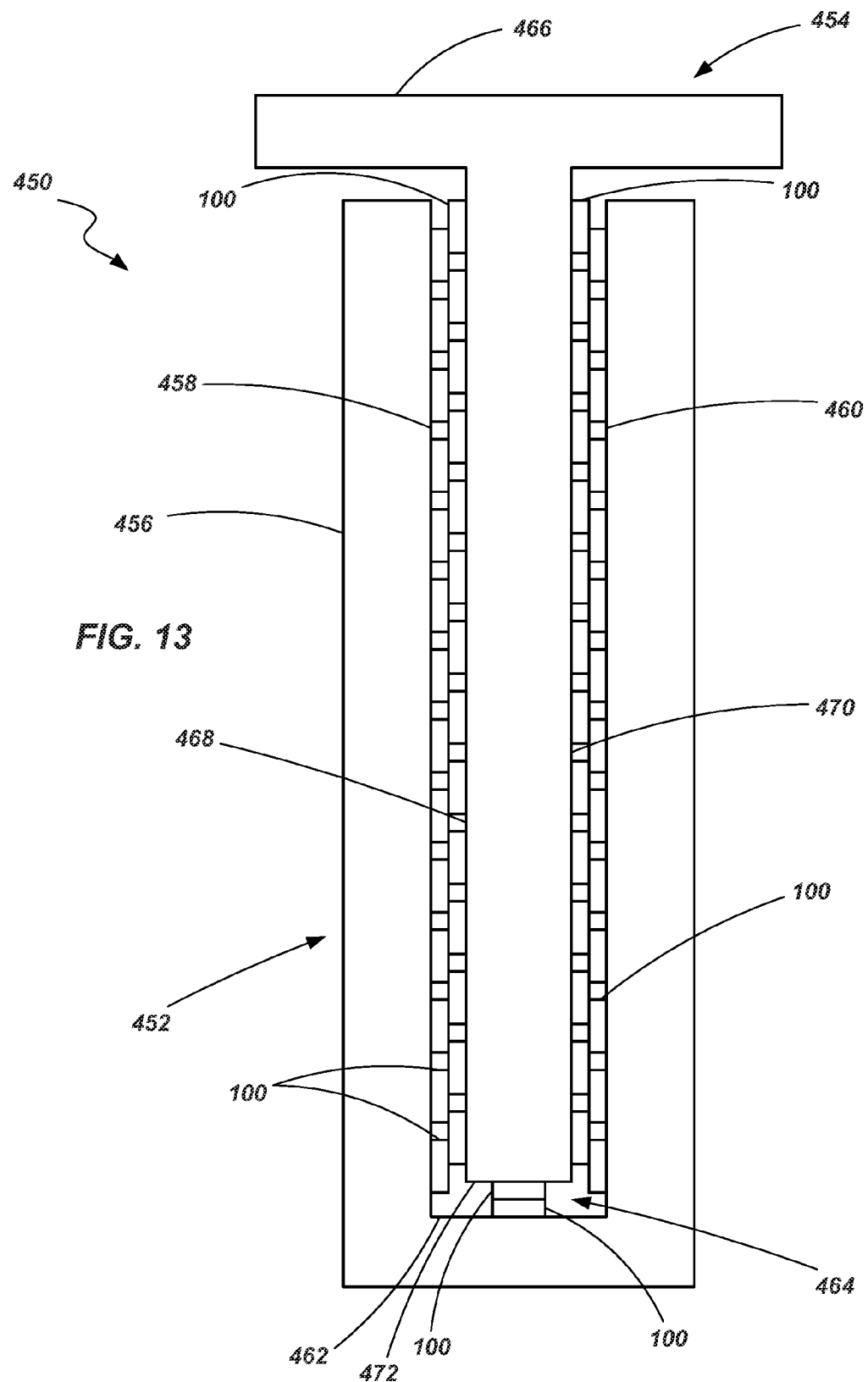
FIG. 13 is a side view of a bearing apparatus in accordance with another embodiment.

Referring to FIG. 13, a side view is shown of a bearing assembly 450 according to another embodiment. The bearing assembly 450 includes a first bearing apparatus 452 and a second bearing apparatus 454. The first bearing apparatus 452 may include a base member 456 having a plurality of bearing elements 100 coupled with multiple surfaces of the base member 456. For example, A plurality of bearing elements 100 may be coupled with each of a first surface 458, a second surface 460 which is spaced apart from (and may be substantially parallel with) the first surface 458, and a third surface 462 which extends between and is at an distinct angle relative to the first two surfaces 458 and 460. It is noted that, while the side view depicted in FIG. 13 only shows a single column of bearing elements 100 on each of the first surface 458 and the second surface 460 (and only shows a single bearing element 100 on the third surface 462), that an array of bearing elements 100 may be provided on each surface. In other embodiments, various patterns of bearing elements may be used such as shown and described hereinabove with respect to other embodiments. The first bearing apparatus 452, therefore, has a first collective bearing surface defined by the bearing elements 100 coupled with the first surface 458 of the base member 456, a second collective bearing surface defined by the bearing elements 100 coupled with the second surface 460 of the base member 456, and a third collective bearing surface defined by the bearing elements 100 coupled with the third surface 462 of the base member 456.

The multiple surfaces 458, 460 and 462 of the base member 456 of the first bearing apparatus 452 define a slot or a cavity 464 which is sized and configured to receive the second bearing apparatus 454. The second bearing apparatus 452 may include a base member 466 having a plurality of bearing elements 100 coupled to multiple surfaces of the base member 466. For example, bearing elements 100 may be coupled with each of a first surface 468, a second surface 470 which is spaced apart from (and may be parallel with) the first surface 468, and a third surface 472 which extends between and is at a distinct angle relative to the first and second surfaces 468 and 470. As noted above with respect to the first bearing apparatus 452, the bearing elements 100 may be arranged in arrays or in any desired pattern on each of the various surfaces 468, 470 and 472. The second bearing apparatus, therefore, has a first collective bearing surface defined by the bearing elements 100 coupled with the first surface 468 of the base member 466, a second collective bearing surface defined by the bearing elements 100 coupled with the second surface 470 of the based member 466, and a third collective bearing surface defined by the bearing elements 100 coupled with the third surface 472 of the based member 466.

With the second bearing apparatus 454 positioned within the slot or cavity 464 defined by the first bearing apparatus 452, bearing elements 100 of the first bearing apparatus engage bearing elements 100 of the second bearing apparatus 454. Stated another way, each collective bearing surface of the first bearing apparatus 452 engages a corresponding collective bearing surface of the second bearing apparatus 454. This arrangement enables the bearing assembly 450 to act as a liner guide, allowing movement in a defined direction. For example, in the embodiment shown in FIG. 13, with weight bearing on the bearing elements 100 associated with the third surfaces 462 and 472 of each bearing apparatus, relative movement between the two bearing apparatuses (and thus between any foundational and/or structural components coupled thereto) is substantially restricted to lateral movement in the direction that would be considered into and out of the page.

Figure 14:
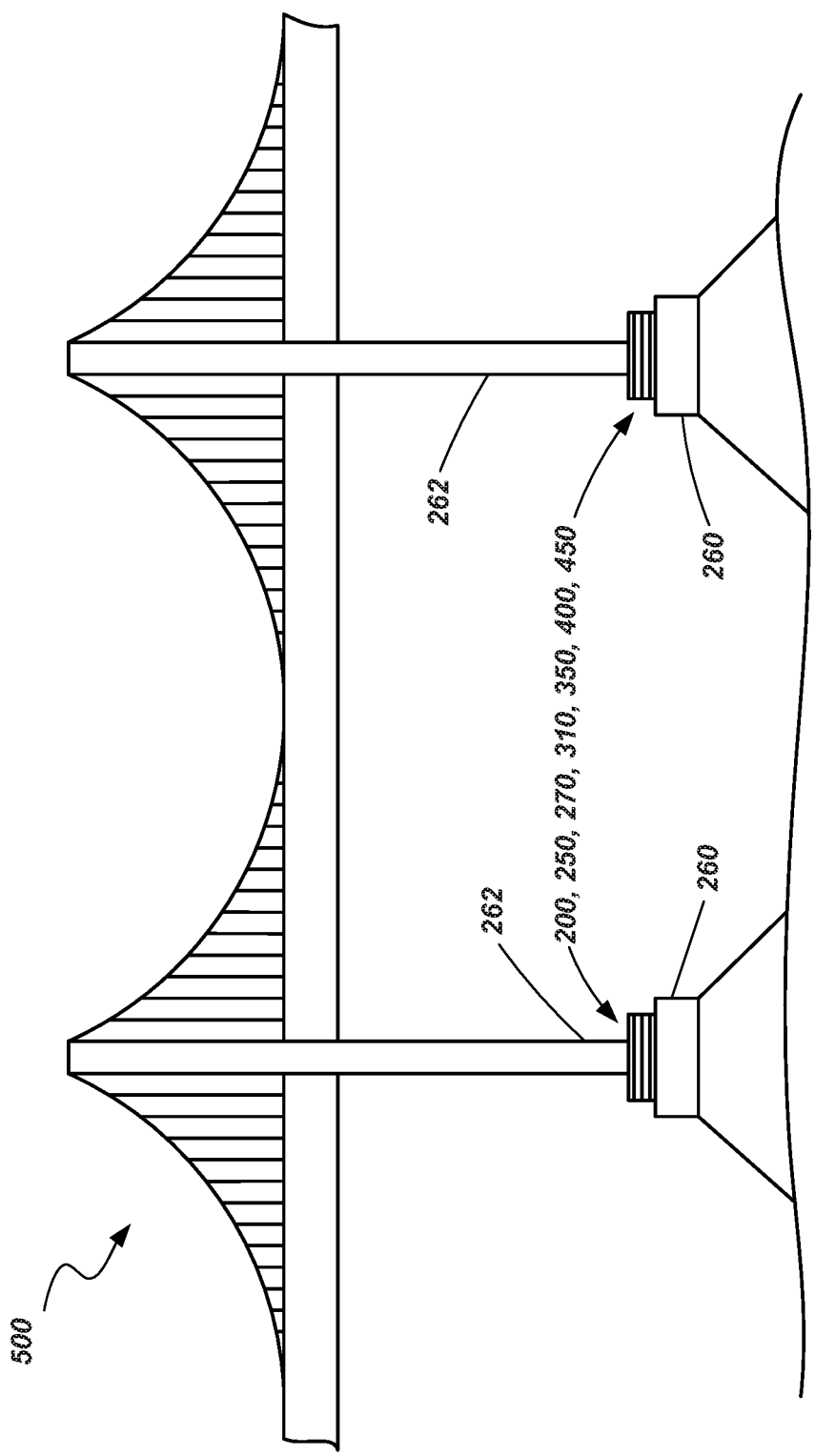
FIG. 14 shows a bridge structure incorporating a bearing assembly in accordance with an embodiment of the present invention.
Figure 15:
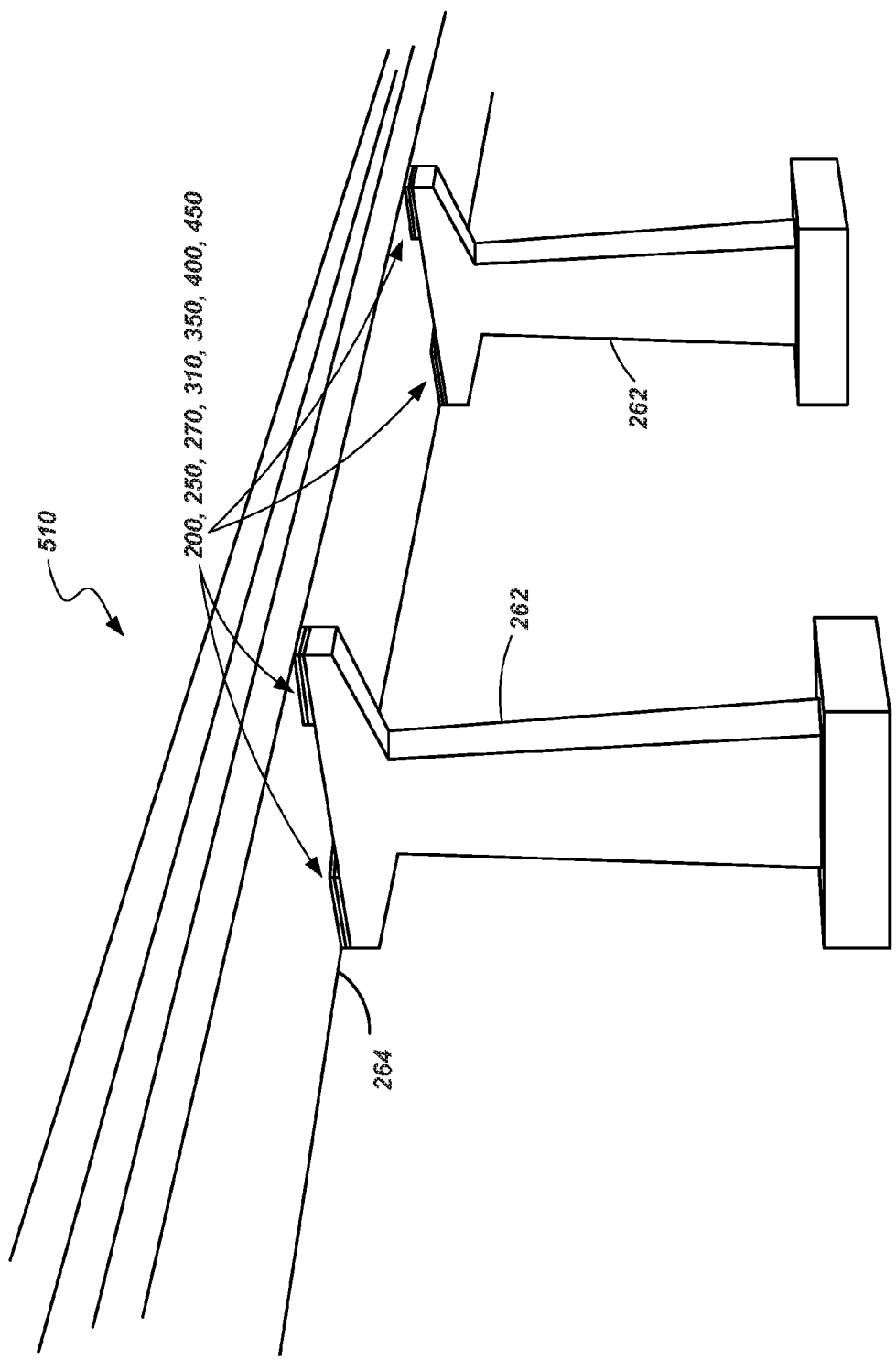
FIG. 15 shows a highway structure incorporating a bearing assembly in accordance with an embodiment of the present invention.
Figure 16:
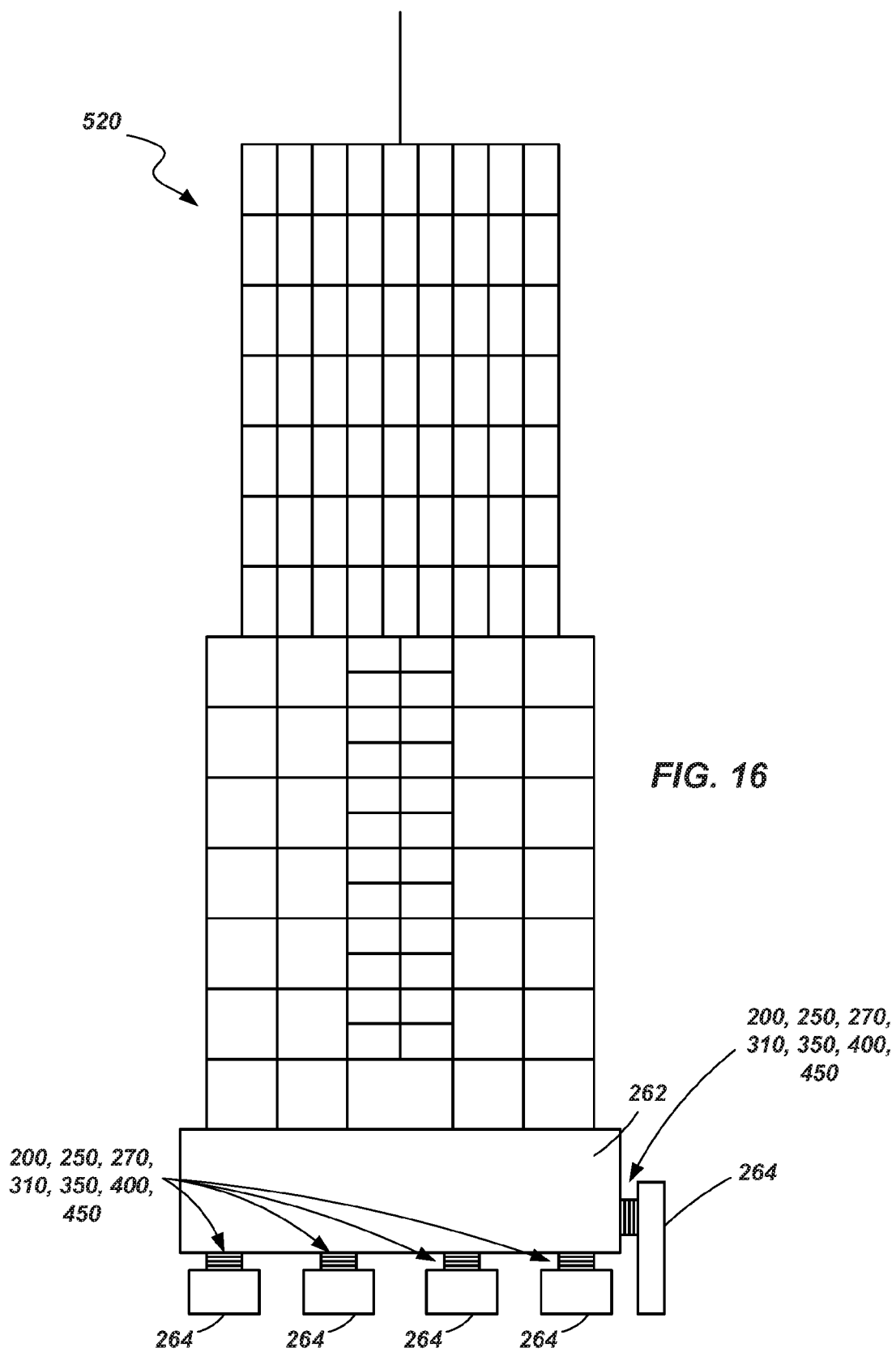
FIG. 16 shows a building incorporating a bearing assembly in accordance with an embodiment of the present invention.

Referring to FIGS. 14-16, various structures are shown incorporating bearing assemblies in accordance with the present invention. FIG. 14 shows a bridge 500 having one or more bearing assemblies (e.g., 200, 250, 270, 310, 350, 400, 450) disposed between a foundational member 260 and a structural component 262. FIG. 15 shows an elevated road or highway section 510 having bearing assemblies (e.g., 200, 250, 270, 310, 350, 400, 450) disposed between a first structural component 262 and a second structural component 264. FIG. 16 shows a building 520 having bearing assemblies (e.g., 200, 250, 270, 310, 350, 400, 450) disposed between a foundational member 260 and a structural component 262. As shown in FIG. 16, the bearing assemblies need not be placed beneath a structure, but may be placed to the side of a structure or in a variety of other locations as will be appreciated by those of ordinary skill in the art. Of course numerous other applications are contemplated and the embodiments shown are not intended to be limiting. Other non-limiting examples of applications for bearing assemblies may include train tracks, movement or articulation of large machinery (e.g., trains, ships, etc.), heavy rigging joints or pads, draw bridges and large roof assemblies.

While the invention may be susceptible to various modifications and alternative forms, specific embodiments have been shown by way of example in the drawings and have been described in detail herein. However, it should be understood that the invention is not intended to be limited to the particular forms disclosed. It is also noted that features of one embodiment may be combined with features of other embodiments without limitation. The invention includes all modifications, equivalents, and alternatives falling within the spirit and scope of the invention as defined by the following appended claims.

What is claimed is:

1. A structure for bearing heavy loads, the structure comprising:
    a foundational member;
    a structural component;
    a bearing assembly disposed between the foundational member and the structural component, the bearing assembly comprising:
        a first bearing apparatus coupled with the foundational member, the first bearing apparatus including a first base member having a first surface exhibiting an area of at least approximately 16 square inches, the first bearing apparatus further including a first plurality of polycrystalline diamond compacts (PDCs) associated with the first surface of the first base member, the first plurality of PDCs defining a first collective bearing surface;
        a second bearing apparatus coupled with the structural component, the second bearing apparatus including a second base member and a second plurality of PDCs associated with the second base member, the second plurality of PDCs defining a second collective bearing surface configured to engage and slide over the first collective bearing surface.

2. The structure of claim 1, wherein the first surface of the first base member exhibits an area of at least approximately 25 square inches.

3. The structure of claim 1, wherein the first surface of the first base member exhibits an area of at least approximately 36 square inches.

4. The structure of claim 1, wherein the first surface of the first base member exhibits an area of at least approximately 2,304 square inches.

5. The structure of claim 1, wherein the first collective bearing surface and the second collective bearing surface are both substantially planar or are both substantially arcuate.

6. The structure of claim 1, wherein the first collective bearing surface is convex and the second collective bearing surface is concave.

7. The structure of claim 1, wherein each of the first plurality of PDCs is substantially cylindrical and exhibits a diameter equal to or less than about 60 millimeters.

8. The structure of claim 7, wherein each of the first plurality of PDCs is substantially cylindrical and exhibits a diameter between about 13 millimeters to about 19 millimeters.

9. The structure of claim 7, wherein each of the second plurality of PDCs is substantially cylindrical and exhibits a diameter equal to or less than about 60 millimeters.

10. The structure of claim 1, wherein the bearing assembly is configured to accommodate at least 50 millimeters of lateral displacement of the second bearing apparatus relative to the first bearing apparatus.

11. The structure of claim 10, wherein the second bearing assembly is configured to accommodate at least 0.05 radians of rotation of the second bearing apparatus relative to the first bearing apparatus.

12. The structure of claim 11, wherein the second bearing assembly is configured to accommodate at least 100 millimeters of lateral displacement of the second bearing apparatus relative to the first bearing apparatus.

13. The structure of claim 12, wherein the second bearing assembly is configured to accommodate at least 200 millimeters of lateral displacement of the second bearing apparatus relative to the first bearing apparatus.

14. The structure of claim 11, wherein the polycrystalline diamond table of at least one of the plurality of PDCs includes a region that is substantially void of catalyst material.

15. The structure of claim 1, wherein each of the first plurality of PDCs is disposed in an associated pocket formed in the first base member.

16. The structure of claim 1, wherein each of the first plurality of PDCs comprises a polycrystalline diamond table disposed on a substrate.

17. A structure comprising:
    a bridge, a roadway, or a building;
    a bearing assembly operably coupled to the bridge, the roadway, or the building, the bearing assembly configured to accommodate relative displacement of the bridge, the roadway, or the building, the bearing assembly comprising:
        a first bearing apparatus including a first base member having a first surface exhibiting an area of at least approximately 16 square inches, the first bearing apparatus further including a first plurality of polycrystalline diamond compacts (PDCs) associated with the first surface of the first base member, the first plurality of PDCs defining a first collective bearing surface;

a second bearing apparatus including a second base member and a second plurality of PDCs associated with the second base member, the second plurality of PDCs defining a second collective bearing surface configured to engage and slide over the first collective bearing surface.

18. The structure of claim 17, wherein the first surface of the first base member exhibits an area of at least approximately 25 square inches and the bearing assembly is configured to accommodate at least 50 millimeters of lateral displacement.

19. The structure of claim 18, wherein the first collective bearing surface and the second collective bearing surface are both substantially planar or are both substantially arcuate.

20. The structure of claim 18, wherein the bearing assembly is configured to accommodate at least 0.05 radians of rotation.

21. The structure of claim 17, wherein each of the first plurality of PDCs is substantially cylindrical and exhibits a diameter equal to or less than about 60 millimeters and each of the first plurality of PDCs comprises a polycrystalline diamond table disposed on a substrate.

* * * * *